UNITED STATES PATENT OFFICE.

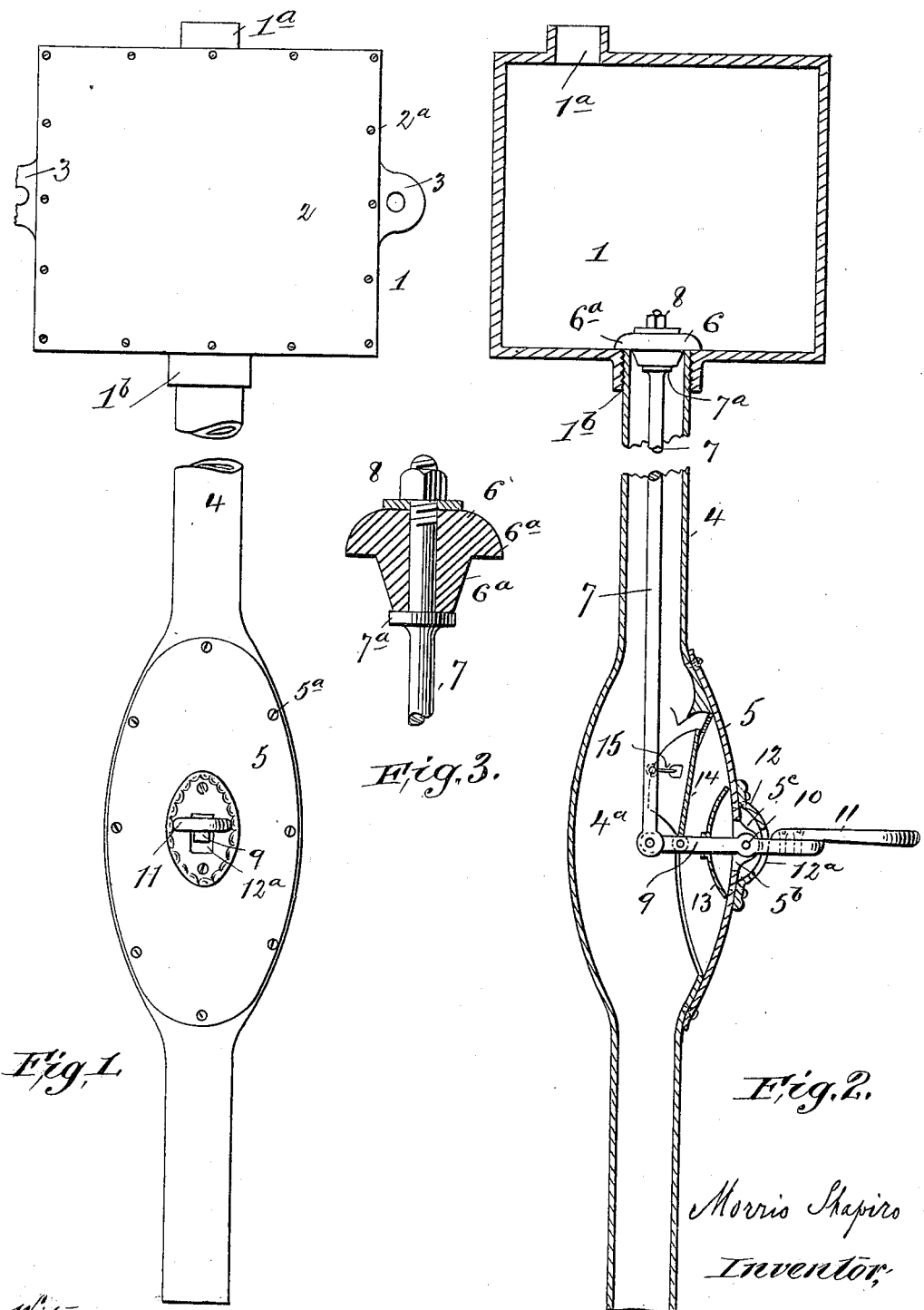

MORRIS SHAPIRO, OF NEW YORK, N. Y.

WATER-TANK.

SPECIFICATION forming part of Letters Patent No. 658,161, dated September 18, 1900.

Application filed February 16, 1900. Serial No. 5,490. (No model.)

*To all whom it may concern:*

Be it known that I, MORRIS SHAPIRO, a subject of the Czar of Russia, residing at New York city, borough of Manhattan, State of New York, have invented certain new and useful Improvements in Water-Tanks, of which the following is a specification.

My invention relates more particularly to water-tanks used in flushing water-closets; and the object of the invention is to provide a tank in which the water will not be exposed to the atmosphere and wherein the usual ball-valve for controlling the inflow of water is dispensed with and simple and direct means are provided for controlling the outflow of water from the tank.

To this end my invention consists in the novel details of improvement, which will be more fully hereinafter set forth and then pointed out in the claims.

Reference is to be had to the accompanying drawings, forming part hereof, wherein—

Figure 1 is a front elevation of a tank and its fittings embodying my invention. Fig. 2 is a vertical cross-section thereof, and Fig. 3 is a detail sectional view of the valve shown in Fig. 2.

In the accompanying drawings, in which similar numerals of reference indicate corresponding parts in the several views, 1 indicates a tank which is closed on all sides and provided at one part with an inlet $1^a$ and at the lower part with an outlet, preferably formed by a depending hub $1^b$. By preference all the walls of tank 1 are cast in a single piece of metal, with the exception of the whole or part of one wall 2, which is made removable for the purpose of permitting access to the interior of the tank and may be held to the tank by screws $2^a$ or the like, a gasket being preferably interposed between the sides of the tank and the wall 2 to prevent leakage. The tank 1 may have ears 3 for attaching it to a wall or other support.

4 is a conduit or pipe leading downwardly from pipe 1 and shown connected with the hub $1^b$, and the conduit or pipe 4 is shown provided with a chamber $4^a$, adapted to receive valve-operating devices. From the chamber $4^a$ the conduit extends downwardly to be connected with a closet or other outlet. The chamber $4^a$ preferably has an opening on one side to permit access to its interior, and said opening is provided with a cover 5, which may be secured thereto by screws $5^a$ or otherwise.

6 is a valve carried by a stem 7, that passes through the conduit or pipe 4 and extends into chamber $4^a$. The valve 6 preferably has a depending portion $6^a$ to form a tight fit at the outlet of tank 1 and a flange $6^a$ extending outwardly to coact with a seat at the outlet of the tank. I have shown the stem 7 as provided with an extension $7^a$ to receive the valve 6 and with a thread end to receive a nut 8, whereby the valve can be clamped to the stem, so as to rise and fall with the latter. The lower end of the stem 7 is pivotally connected with a lever or valve-operator 9, that projects through an opening $5^b$ in a wall of the chamber $4^a$, being shown located in cover 5. The cover 5 is provided with lugs $5^c$, between which the lever 9 is located and whereby the pivot 10, that passes through said lever and into said lugs, supports the lever, so that it may oscillate.

11 is a handle at the outer end of the lever 9, whereby the same may be manipulated, and by preference the parts 9 and 11 are made separate and connected together by suitable means, as by screws, whereby the handle 11 can be detached from the lever, so that the cover 5 can be removed to permit access to the interior of the chamber $4^a$. By preference I provide a shield 12, that is secured to cover 5, so as to overlie the lugs $5^c$, and said shield is shown provided with a slot $12^a$, through which the lever 9 passes and whereby it may oscillate. The lever 9 is shown provided within the chamber $4^a$ with a shield 13, that is adapted to come in contact with the cover 5 and to be raised and lowered with the lever 9, so as to cover the slots $5^b$ and $12^a$ and to resist the passage of water therethrough as it travels down through chamber $4^a$. In order to deflect the water from the slots $5^b$ and $12^a$, I have shown the lever 9 as provided with a deflector 14, that extends upwardly therefrom and is adapted to rise and fall therewith, its upper end being adapted to engage a portion of the wall of chamber $4^a$ when the lever 9 is tilted to unseat the valve 6. The deflector 14 may be connected at its lower end with lever 9 in any suitable manner and may be connected also with stem 7, as by a link or the link 15, so that said deflector will be guided in its up-and-down movements. In the normal position of the valve and lever the valve will be upon its seat to close the outlet of the tank and the deflector 14 will be at a distance from the wall of chamber $4^a$. When it is desired to allow water to pass from the tank, the outer end of the lever is depressed and its inner end correspondingly raised, whereby the stem 7 and the valve 6 will be pushed upwardly to uncover the outlet from the tank, and thereupon the deflector 14 will come in engagement with the corresponding wall of chamber $4^a$. As the water passes down through chamber $4^a$ the deflector 14 will prevent the water from reaching the slots $5^b$ and $12^a$, so that the water will not leak from chamber $4^a$ at the joint of the lever 9 therewith. As the tank is closed from the atmosphere, the water therein will not become polluted from exposure, and there is no requirement for an automatic valve in the tank to regulate the inflow of water, as the water cannot overflow from the tank. The device is comparatively simple to manufacture, efficient in operation, and not liable to get out of order.

While I have shown a handle 11 attached to lever 9, it is evident that the handle can be dispensed with and the lever operated directly, or other suitable means can be provided for manipulating the lever.

Having now described my invention, what I claim is—

1. The combination of a tank and conduit leading therefrom, with a valve to control the passage of water from the conduit, a stem extending from said valve and located in the conduit, a lever connected with said stem and pivotally supported so as to project through an opening in the conduit, a movable shield carried by the lever within the conduit, and a shield having an opening for the passage of the lever and secured on the exterior of the conduit, said shield serving to prevent water from passing through the opening in the conduit through which the lever projects, substantially as described.

2. The combination of a tank and a conduit leading therefrom, and a valve to control the passage of water from the conduit, a stem extending from said valve and located in the conduit, a lever connected with said stem and pivotally supported so as to project through an opening in the conduit, a deflector extending upwardly from the lever, and a shield connected with said lever and extending in line with the opening through which the lever projects to cover the same during the movements of the lever, substantially as described.

3. The combination of a tank and a conduit leading therefrom, with a valve to control the passage of water from the conduit, a stem extending from said valve and located in the conduit, a lever connected with said stem and pivotally supported so as to project through an opening in the conduit, and a deflector carried by said lever and projecting upwardly normally out of contact with the wall of the conduit but adapted to engage the same when the lever is operated to raise the valve from its seat, substantially as described.

4. The combination of a tank and a conduit leading therefrom, with a valve to control the passage of water from the conduit, a stem extending from said valve and located in the conduit, a lever connected with the said stem and pivotally supported so as to project through an opening in the conduit, and a deflector carried by the lever and projecting upwardly and adapted to engage a wall in the conduit when the lever is raised, and means for connecting said deflector with the said stem for sustaining the deflector in position, substantially as described.

MORRIS SHAPIRO.

Witnesses:
MORRIS BRAFF,
I. BENEQUIT.